United States Patent
Lutzke et al.

(10) Patent No.: US 7,578,529 B2
(45) Date of Patent: Aug. 25, 2009

(54) QUICK CONNECT COLLET RETAINER WITH SELF-CENTERING STRUCTURE

(75) Inventors: Matthew David Lutzke, Fenton, MI (US); Brian Graichen, Centerline, MI (US)

(73) Assignee: Cooper Technology Services, LLC, Findlay, OH (US)

( * ) Notice: Subject to any disclaimer, the term of this patent is extended or adjusted under 35 U.S.C. 154(b) by 247 days.

(21) Appl. No.: 10/582,424

(22) PCT Filed: Dec. 9, 2003

(86) PCT No.: PCT/US03/38925

§ 371 (c)(1),
(2), (4) Date: Jun. 9, 2006

(87) PCT Pub. No.: WO2005/064220

PCT Pub. Date: Jul. 14, 2005

(65) Prior Publication Data

US 2007/0164564 A1    Jul. 19, 2007

(51) Int. Cl.
*F16L 37/00* (2006.01)
(52) U.S. Cl. ....................... 285/321; 285/307
(58) Field of Classification Search ........... 285/321, 285/307, 314, 315
See application file for complete search history.

(56) References Cited

U.S. PATENT DOCUMENTS

| 4,216,982 | A | * | 8/1980 | Chow | 285/315 |
| 4,850,622 | A | * | 7/1989 | Suzuki | 285/321 |
| 4,889,368 | A | * | 12/1989 | Laipply | 285/321 |
| 5,005,877 | A | * | 4/1991 | Hayman | 285/321 |
| 5,443,289 | A | * | 8/1995 | Guest | 285/39 |
| 5,887,911 | A | * | 3/1999 | Kargula | 285/307 |
| 6,857,667 | B2 | * | 2/2005 | Malone | 285/307 |

OTHER PUBLICATIONS

Written Opinion dated Jul. 30, 2008.

* cited by examiner

*Primary Examiner*—David E Bochna
(74) *Attorney, Agent, or Firm*—Carlson, Gaskey & Olds, PC

(57) ABSTRACT

A collet quick connect fluid coupling includes a self-centering structure that is received within a channel (36) in a pilot (32). The channel and self-centering leg (28) ensures the collet (26) is approximately centered within the housing (22) as a tube (38) is moved into the housing. This prevents misalignment of the collet relative to the tube (38). In a preferred embodiment, the collet (26) has a ramp (30) on an inwardly facing surface that cams along a surface on the pilot (32), assisting the collet (26) in expanding when a tube (38) is moved into a housing (22).

4 Claims, 1 Drawing Sheet

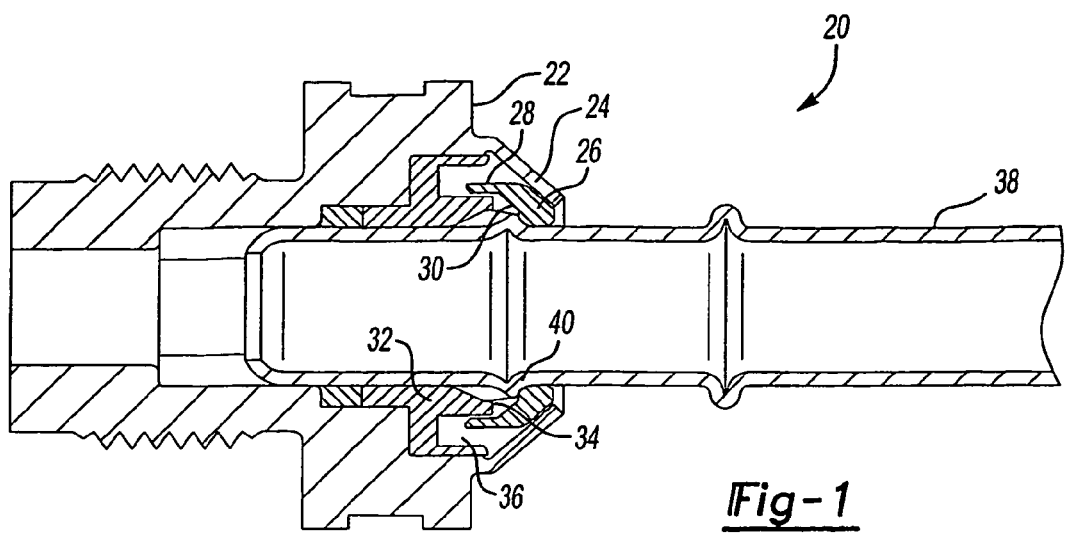
Fig-1
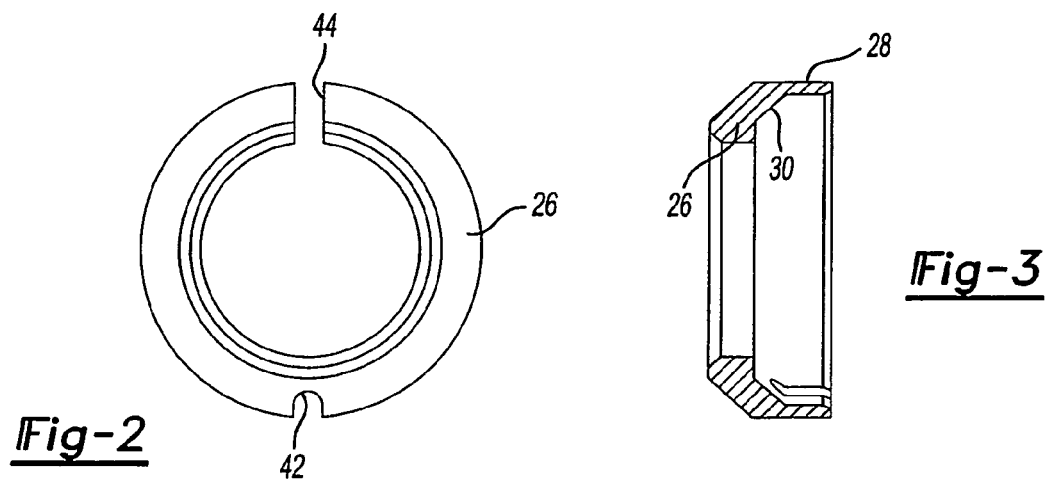
Fig-2
Fig-3
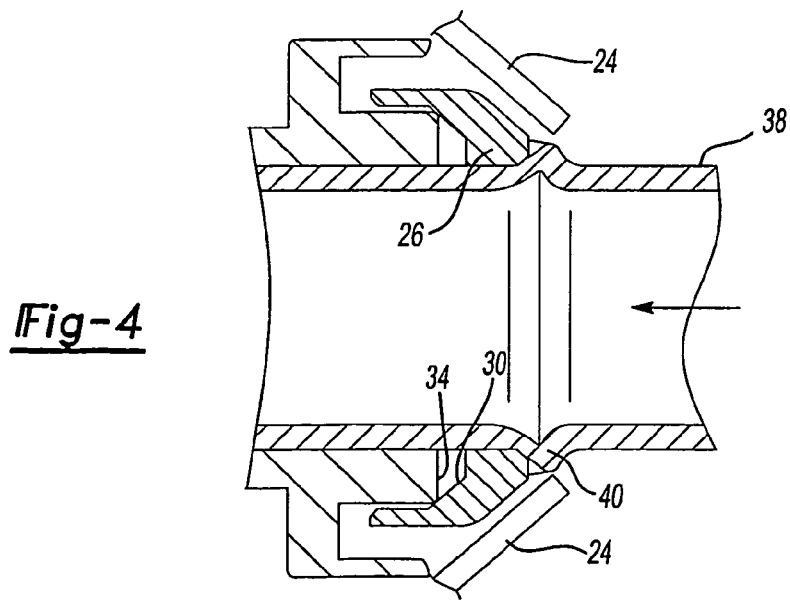
Fig-4

QUICK CONNECT COLLET RETAINER WITH SELF-CENTERING STRUCTURE

BACKGROUND OF THE INVENTION

This application relates to a collet quick connect fluid handling connector, wherein the collet is self-centering within a tube housing.

Fluid connectors include a type known as a quick connect coupling. A quick connect coupling generally includes a resilient portion that is biased away from a relaxed position by a fluid handling member such as a tube. Generally, the tube includes an upset or enlarged portion that passes through the quick connect retainer, moving the resilient portion of the quick connect retainer away from the relaxed position. Once the upset portion has passed this portion, the portion can move back to its relaxed position, now securing the tube within a housing structure.

One type of quick connect retainer is a collet retainer. In a collet retainer, the retainer is generally cylindrical, with an expansion gap through the collet retainer at one circumferential position. As the upset portion engages the collet retainer, the collet retainer expands at this expansion gap, such that the upset portion can pass. Once the upset portion has passed the collet retainer, the collet retainer returns to its relaxed position, outward of the upset portion, and retaining the tube within the housing.

Collet retainers have gained much success. However, one challenge with a collet retainer is that it can be off-center within a housing opening. When this occurs, and the tube is moved into the housing, the tube may sometimes move the collet retainer even further away from an acceptable position. This is of course undesirable.

SUMMARY OF THE INVENTION

In a disclosed embodiment of this invention, a collet retainer is provided with self-centering structure to hold the collet retainer in an approximately centered position in the housing until the tube is inserted into the housing. More preferably, the self-centering structure includes a leg extending from the retainer portion of the collet that fits into a channel. The channel is preferably formed within a pilot positioned inward of the collet retainer.

In another feature, the collet retainer preferably has a ramp surface facing inward that cams along a guiding surface as the collet is brought inwardly by the upset portion of the tube. The ramp surface assists in the collet retainer being cammed to its opened position. Thus, the upset portion is more easily moved beyond the collet retainer. Again, in a most preferred embodiment, it is the pilot positioned inwardly of the collet retainer that causes the ramp surface to be cammed outwardly.

These and other features of the present invention can be best understood from the following specification and drawings, the following of which is a brief description.

BRIEF DESCRIPTION OF THE DRAWINGS

FIG. 1 is a cross-sectional view through a fluid handling assembly.

FIG. 2 is a front view of a collet retainer according to this invention.

FIG. 3 is a cross-sectional view through FIG. 2.

FIG. 4 shows a feature of the collet retainer as a tube is being inserted.

DETAILED DESCRIPTION OF THE PREFERRED EMBODIMENT

A fluid handling assembly 20 is illustrated in FIG. 1. As shown, a housing 22 includes an outer structure 24 retaining a collet retainer 26. Collet retainer 26 is formed with an axially inwardly extending leg 28. Further, an inward-facing surface of the collet retainer 26 is formed at a ramp angle. In a preferred embodiment, this angle is at 45° relative to a central axis of the collet retainer 26.

A pilot 32 has an inner end 34 that faces the ramp surface 30. Further, a channel 36 is formed in the pilot 32. As can be appreciated in FIG. 1, the leg 28 is received within the channel 36. The positioning of the leg 28 within the channel 36 ensures that the collet retainer remains at least approximately centered within the housing 22 until insertion of the tube 38. As is known, the tube 38 is formed with an upset portion 40 that moves inward of the housing 22, and past the collet retainer 26, such that it is secured as shown in FIG. 1.

FIG. 2 is a front view of the collet retainer 26. As known, a collet retainer has an expansion gap 44 between two circumferential ends. This gap allows the pilot retainer to expand radially outwardly when the upset portion 40 engages the collet retainer 26, allowing the upset portion 40 to move into the housing 22 and beyond the collet retainer 26. A groove 42 is formed approximately at a circumferentially opposed location to the gap 44, and further assists this expansion.

FIG. 3 is a cross-sectional view through the collet 26, and shows the ramp surface 30, and the centering leg 28.

As shown in FIG. 4, as the tube 38 is being inserted, the upset portion 26 initially contacts an outer surface of the collet retainer 26. The upset portion 44 will carry the collet retainer inwardly until the ramp surface 30 engages end 34 of the pilot 32. At that point, the ramp surface 30 will cam along end 34, causing the collet retainer 26 to expand radially outwardly about the groove 42, and separating at gap 44 to be circumferentially larger such that the upset portion 40 can move beyond the collet retainer 26. At that point, the collet retainer 26 will snap back inwardly to its relaxed position, outward of the upset portion 40 and holding the tube 38 as shown in FIG. 1.

By providing the centering structures 28 and 36, the present invention ensures the collet retainer is properly positioned in the housing 22 prior to insertion of the tube. Moreover, the ramp surface 30 assists this radially outward expansion.

Although a preferred embodiment of this invention has been disclosed, a worker of ordinary skill in this art would recognize that certain modifications would come within the scope of this invention. For that reason, the following claims should be studied to determine the true scope and content of this invention.

The invention claimed is:

1. A fluid handling combination assembly comprising:
   a housing;
   a collet retainer received within said housing, said collect retainer extending generally circumferentially around a central axis, with an expansion gap at one circumferential location and a groove at another circumferential location, said collect retainer being provided with self-centering structure for ensuring said collect retainer is generally centered about a central axis of said housing, wherein said self-centering structure includes a pilot member having a channel extending between a radially outer pilot wall and a radially inner pilot wall, and a leg on said collet retainer that extends axially inwardly for being received within said channel to center said collet retainer, said collet retainer including a ramped surface that is transversely angled relative to the leg, said ramped surface coming into contact with the pilot member when said tube is moved to bring said collet retainer axially into said housing, said pilot member causing said ramped surface of said collet retainer to cam radially outwardly and assist radial expansion of said collet retainer; and a tube held within said housing by having an upset portion positioned inwardly of said collect retainer.

2. An assembly as set forth in claim 1, wherein said groove is circumferentially located about 180 degrees along said collet from said expansion gap.

3. An assembly as set forth in claim1, wherein said groove is U-shaped.

4. An assembly as set forth in claim 1, wherein said groove extends partially radially into said collet retainer and said expansion gap extends fully radially through said collet retainer.

* * * * *

UNITED STATES PATENT AND TRADEMARK OFFICE
CERTIFICATE OF CORRECTION

PATENT NO. : 7,578,529 B2  Page 1 of 1
APPLICATION NO. : 10/582424
DATED : August 21, 2009
INVENTOR(S) : Lutzke et al.

It is certified that error appears in the above-identified patent and that said Letters Patent is hereby corrected as shown below:

Claim 1, Column 2, Line 56, change "collect" to --collet--.
Claim 1, Column 2, Line 60, change "collect" to --collet--.
Claim 1, Column 2, Line 61, change "collect" to --collet--.
Claim 1, Column 3, Line 10, change "collect" to --collet--.

Signed and Sealed this

Twenty-seventh Day of October, 2009

David J. Kappos
*Director of the United States Patent and Trademark Office*

UNITED STATES PATENT AND TRADEMARK OFFICE
CERTIFICATE OF CORRECTION

PATENT NO.      : 7,578,529 B2  
APPLICATION NO. : 10/582424  
DATED           : August 25, 2009  
INVENTOR(S)     : Lutzke et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 324 days.

Signed and Sealed this

Seventh Day of September, 2010

David J. Kappos  
*Director of the United States Patent and Trademark Office*